(12) United States Patent
Abraham et al.

(10) Patent No.: US 9,057,788 B2
(45) Date of Patent: Jun. 16, 2015

(54) PHOTON COUNTING-BASED VIRTUAL DETECTOR

(75) Inventors: Douglas Abraham, Topsfield, MA (US); David Rozas, Brighton, MA (US)

(73) Assignee: Analogic Corporatiom, Peabody, MA (US)

( * ) Notice: Subject to any disclaimer, the term of this patent is extended or adjusted under 35 U.S.C. 154(b) by 488 days.

(21) Appl. No.: 13/365,633

(22) Filed: Feb. 3, 2012

(65) Prior Publication Data

US 2013/0200269 A1 Aug. 8, 2013

(51) Int. Cl.
*G01T 1/166* (2006.01)
*G01T 1/164* (2006.01)
*G01J 1/42* (2006.01)

(52) U.S. Cl.
CPC ............. *G01T 1/1647* (2013.01); *G01J 1/4228* (2013.01)

(58) Field of Classification Search
CPC .............................. G01J 1/4228; G01T 1/1647
USPC ........................................ 250/363.04, 370.09
See application file for complete search history.

(56) References Cited

U.S. PATENT DOCUMENTS

| | | | |
|---|---|---|---|
| 5,875,173 A * | 2/1999 | Ohgane et al. | 370/230 |
| 2001/0018659 A1* | 8/2001 | Koritzinsky et al. | 705/3 |
| 2003/0185213 A1* | 10/2003 | Malomsoky et al. | 370/395.1 |
| 2006/0249747 A1* | 11/2006 | Shushakov et al. | 257/122 |
| 2007/0114424 A1* | 5/2007 | Danielsson et al. | 250/370.09 |
| 2007/0228259 A1* | 10/2007 | Hohenberger | 250/214 LA |
| 2009/0114849 A1* | 5/2009 | Schneider et al. | 250/492.1 |
| 2009/0238427 A1* | 9/2009 | Hsieh et al. | 382/131 |

\* cited by examiner

*Primary Examiner* — David Porta
*Assistant Examiner* — Abra Fein
(74) *Attorney, Agent, or Firm* — Cooper Legal Group LLC

(57) ABSTRACT

Among other things, one or more techniques and/or systems are described for creating virtual channels in a photon emitting imaging modality. The imaging modality comprises a plurality of photon counting channels. Information yielded from two or more photon counting channels during a same or similar acquisition view may be combined to yield a virtual channel that represents a portion of the detection surface substantially equivalent to an area comprised by the two or more photon counting channels. In one example, within a same acquisition view, some virtual channels may comprise a different number of photon counting channels than other virtual channels. Also, different sets of virtual channels may be created for a same acquisition view to produce different images from a single set of data, for example, where there may be overlap between virtual channels such that the same photon counting channel is comprised in more than one virtual channel.

20 Claims, 5 Drawing Sheets

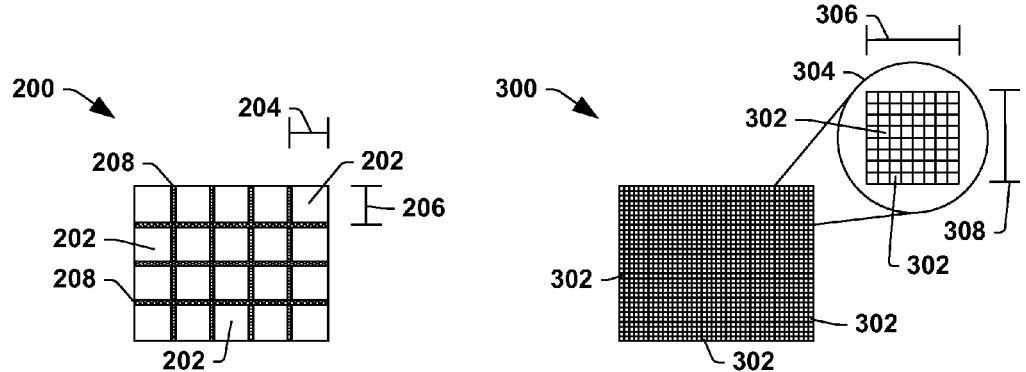
FIG. 2 (Prior Art)     FIG. 3
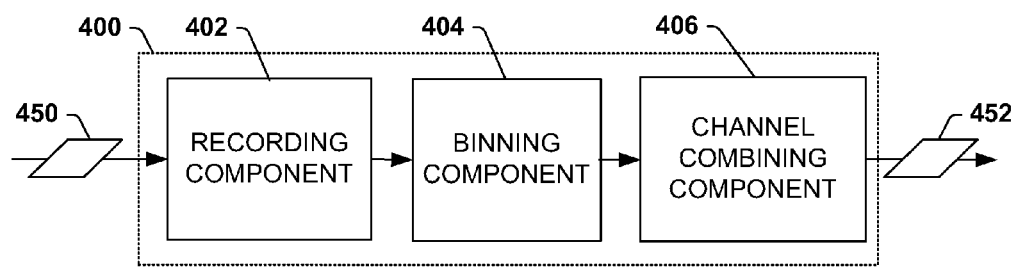
FIG. 4

500

| 100 | 99 | 98 | 90 | 95 | 91 | 90 | 98 | 104 |
|---|---|---|---|---|---|---|---|---|
| 100 | 112 | 90 | 110 | 106 | 104 | 98 | 101 | 100 |
| 101 | 99 | 100 | 97 | 96 | 105 | 103 | 100 | 118 |
| 105 | 104 | 98 | 115 | 110 | 112 | 114 | 110 | 105 |
| 103 | 98 | 92 | 95 | 94 | 93 | 101 | 106 | 104 |
| 106 | 101 | 96 | 95 | 97 | 102 | 97 | 99 | 104 |

| Channel | Totaled Counted | Average | Weight |
|---|---|---|---|
| 1 | 899 | 99.9 | .111 |
| 2 | 894 | 99.3 | .111 |
| 3 | 912 | 101.3 | .111 |
| 4 | 903 | 100.3 | .111 |
| 5 | 913 | 101.4 | .111 |
| 6 | 940 | 104.4 | .111 |

| 100 | 99 | 98 | 90 | 95 | 91 | 90 | 98 | 104 |
|---|---|---|---|---|---|---|---|---|
| 100 | 112 | 90 | 110 | 106 | 104 | 98 | 101 | 100 |
| 101 | 99 | 100 | 97 | 96 | 105 | 103 | 100 | 118 |
| 105 | 104 | 98 | 115 | 110 | 112 | 114 | 110 | 105 |
| 103 | 98 | 92 | 95 | 94 | 93 | 101 | 106 | 104 |
| 106 | 101 | 96 | 95 | 97 | 102 | 97 | 99 | 104 |

FIG. 7

PHOTON COUNTING-BASED VIRTUAL DETECTOR

BACKGROUND

The present application relates to the field of imaging modalities. It finds particular application to imaging modalities that can employ photon counting techniques (e.g., such as image modalities that employ x-ray and/or gamma radiation). For example, medical, security, and/or industrial applications may utilize a computed tomography (CT) scanner comprising photon counting channels to count the number of photons that are detected by respective channels. Based upon the number of photons detected, one or more images providing a two-dimensional and/or three-dimensional representation of an object under examination may be generated therefrom.

Today, CT and other imaging modalities (e.g., single-photon emission computed tomography (SPECT), mammography, digital radiography, etc.) are useful to provide information, or images, of interior aspects of an object under examination. Generally, the object is exposed to radiation comprising photons (e.g., such as x-rays, gamma rays, etc.), and an image(s) is formed based upon the radiation absorbed and/or attenuated by the interior aspects of the object, or rather an amount of photons that is able to pass through the object. Generally, highly dense aspects of the object absorb and/or attenuate more radiation than less dense aspects, and thus an aspect having a higher density, such as a bone or metal, for example, will be apparent when surrounded by less dense aspects, such as muscle or clothing.

Radiographic imaging modalities generally comprise, among other things, a detector array comprised of a plurality of channels that are respectively configured to convert radiation that has traversed the object into signals that may be processed to produce the image(s). The channels are typically "charge integrating" and/or "photon counting" type channels (e.g., the imaging modality operates in charge integration mode, photon counting mode, or both).

Charge integrating channels are configured to convert energy into signals (e.g., current or voltage signals) that are proportional to an incoming photon flux rate. Respective signals may then be integrated over a time period (e.g., at times referred to as a measurement interval), sampled, and digitized. While this type of channel is widely used, there are several drawbacks to such channels. For example, charge integrating channels are generally not able to provide feedback as to the number and/or energy of photons detected. As another drawback, there is a lower limit of detection defined by noise in the channel such that a channel with little to no incident radiation may produce some signal due to thermal and/or analog read noise (e.g., produced by the detector array and/or readout components). It will be appreciated that as a result of this lower limit, the dose of radiation that is applied to an object under examination is generally greater than the dose of radiation that may be applied to the object if the channels are of a photon counting type.

Photon counting channels are configured to convert energy into signals that are proportional to the energy of a detected photon (e.g., at times referred to as a detection event). Thus, ideally, signals produced by respective channels generally comprise one or more current and/or voltage pulses, for example, respectively associated with a single detection event. A controller may then be used to determine the location and energy of respective detection events, accumulate the detection events occurring during a measurement interval (e.g., an "acquisition view"), digitize the information, and/or process the digital information to form an image, for example.

It will be appreciated that there are numerous advantages to photon counting channels over charge integrating channels. For example, the counting of photons is essentially noise free (e.g., apart from inherent photon shot noise). Therefore, a lower dose of radiation may be applied to the object under examination. Moreover, photon counting channels generally allow for energy or wavelength discrimination. Therefore, images resulting from radiation emitted at different energy levels may be obtained at the same or substantially the same time, for example.

While photon counting detector arrays (e.g., detector arrays comprising photon counting channels) have numerous advantages over charge integrating detector arrays, photon counting detector arrays have not been widely applied in some imaging modalities (e.g., such as CT) that have a high photon emission rate. One reason photon counting detector arrays have not been widely adopted is due to saturation issues (e.g., pulse pileup). Saturation occurs when photons are detected at a rate that causes one or more channels to be unable to return to a normal state after the detection of a photon before another photon is detected. That is, stated differently, respective channels of the detector array are configured to emit an electric pulse when a photon is detected. The electric pulse is intended to be merely indicative of a single detection event and is typically counted as a single detection event. However, when two or more photons are detected by a channel in close temporal proximity, the emitted electric pulse may be indicative of two or more detection events (e.g., because the channel was not able to return to an electrically normal state prior to the detection of a second, third, etc. photon, causing the pulses to pile-up). Because the counters are typically configured to count a single detection event per pulse, the counters may mistakenly count merely a single detection event when the pulse is, in fact, indicative of two or more detection events. Thus, due to this phenomenon, photon counting detector arrays are generally unable to process photon emission rates normally utilized in computed tomography scanners and/or other imaging modalities.

SUMMARY

Aspects of the present application address the above matters, and others. According to one aspect a system for an imaging modality is provided. The system comprises a radiation source configured to emit radiation photons and a detector array configured to detect radiation photons emitted by the radiation source, the detector array comprising a plurality of photon counting channels, respective photon counting channels configured to generate a signal. The system also comprises a channel combining component configured to combine information generated by at least some of the plurality of photon counting channels to generate one or more virtual channels, respective virtual channels representing at least two photon counting channels.

According to another aspect, a method for generating virtual channels in an imaging modality is provided. The method comprises generating information from respective photon counting channels of a detector array, the generated information indicative of a number of photons counted by respective photon counting channels of the detector array. The method also comprises generating a first virtual channel representing two or more of the photon counting channels based at least in part upon the generated information.

According to yet another aspect a computer readable medium comprising computer executable instructions that when executed via a processor perform a method is provided. The method comprises generating information from respective photon counting channels of a detector array, the generated information indicative of a number of photons counted by respective photon counting channels. The method also comprises generating a first virtual channel representing two or more of the photon counting channels based at least in part upon the generated information.

Those of ordinary skill in the art will appreciate still other aspects of the present application upon reading and understanding the appended description.

FIGURES

The application is illustrated by way of example and not limitation in the figures of the accompanying drawings, in which like references generally indicate similar elements and in which:

FIG. 2 illustrates an example indirect conversion, charge integrating detector array.

FIG. 3 illustrates an example photon counting detector array.

FIG. 4 illustrates an example photon data processor configured to process signals generated by respective channels of a photon counting detector array and combine information from two or more channels to generate a virtual channel representing the two or more channels.

FIG. 5 illustrates an example photon counting detector array wherein virtual channels are imposed.

FIG. 6 illustrates an example table representing example virtual channels that may be created by a channel combining component.

FIG. 7 illustrates an example photon counting detector array wherein virtual channels are imposed.

DESCRIPTION

Figure 1:
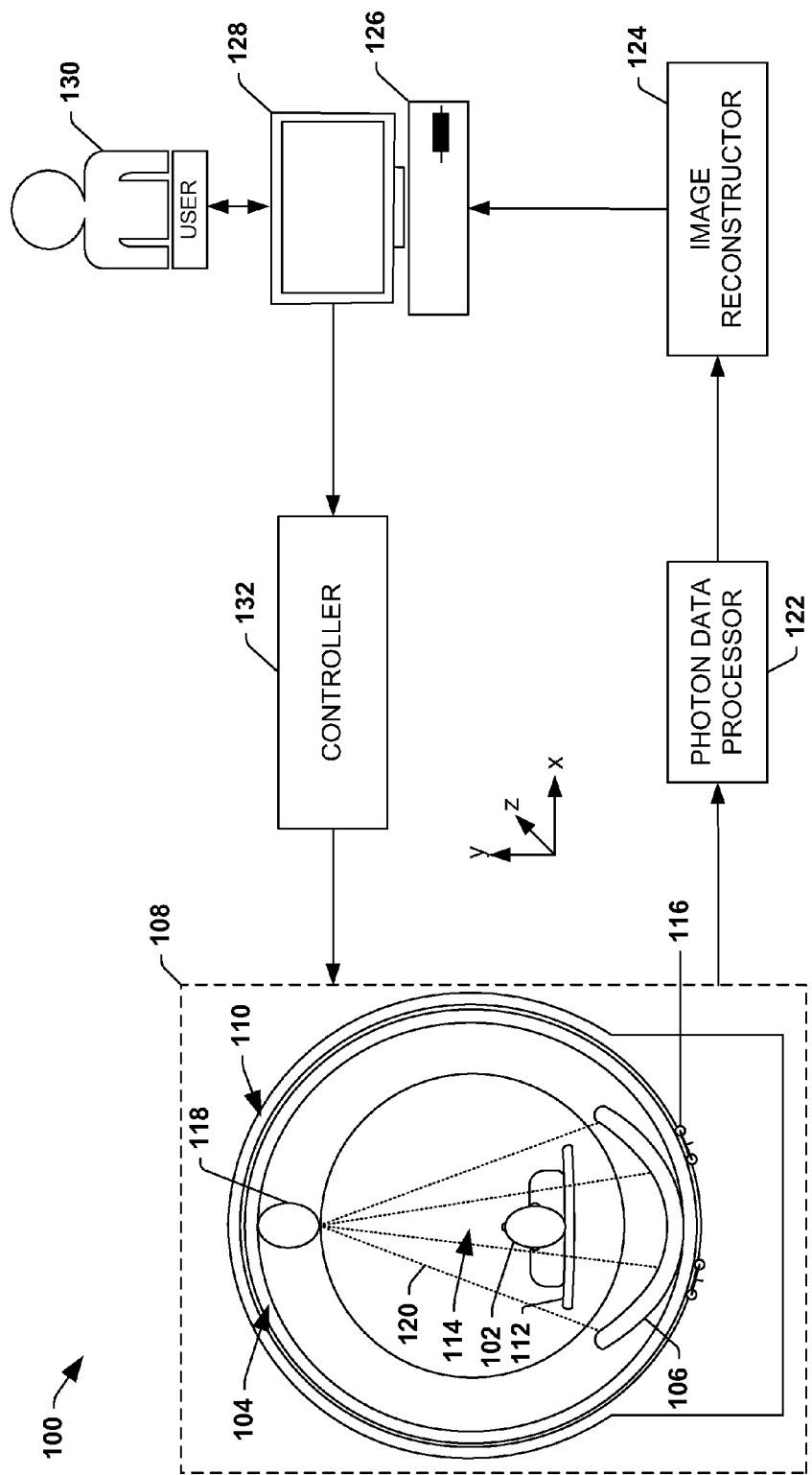
FIG. 1 is an example environment of a first image modality configured to employ photon counting technology.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Among other things, one or more systems and/or techniques are provided herein for combining information from two or more photon counting channels to generate one or more virtual channels that have an effective detection surface that is typically larger than a detection surface of respective photon counting channels. Stated differently, conventionally, a detector array has been comprised of channels that have a detection surface measuring on the order of 1 mm². A photon counting detector array, as provided for herein, may comprise photon counting type channels that respectively have a smaller detection surface than conventional channels (e.g., respective channels may have a detection surface measuring 0.5 mm² or less), although the total detection surface area of the detector may remain unchanged (e.g., there may be more channels per unit area relative to a conventional detector array). Data (or signals) from a plurality of (e.g., two or more) channels may be combined to create a virtual channel (e.g., also referred to herein as a synthetic channel and/or the like) indicative of the output from the plurality of channels. In this way, it may be said that one or more physical channels are oversampled (e.g., the information from one or more physical channeled are combined) to form an output (e.g., a virtual channel) indicative of the oversampling (e.g., or combination). In one embodiment, at least some of the virtual channels may respectively represent a portion of the detection surface substantially equivalent to the detection surface of a conventional channel (e.g., the virtual channel may represent a plurality of channels that, when combined, have a detection surface measuring on the order of 1 mm²), although respective virtual channels may be larger or smaller than a conventional channel.

One advantage of the smaller photon counting channels (e.g., relative to conventional channels) is that the number of photons detected by respective channels is reduced (e.g., the rate of detection on a per channel basis is reduced). Therefore, photons may be emitted at a faster rate (e.g., more comparable with conventional CT imaging modality rates) while mitigating saturation issues that traditionally have arisen with photon counting detectors. Moreover, as mentioned above, an advantage of photon counting channels over conventional charge integrating channels is that the signal-to-noise ratio may be limited by the quantum noise of the combined data (e.g., combined channel signals). That is, the mere combination of the data does not contribute additional electronic noise (e.g., unlike charge integration which may contribute to electronic noise).

It will be appreciated that there are many bases upon which data from photon counting channels can be combined to create virtual channels in accordance with the provisions set forth herein, which may provide numerous benefits over conventional channels. In one embodiment, channels may be selected to be combined to form virtual channels in a manner that mimics a flying focal spot in the x and/or z direction for a same and/or similar acquisition view. By way of example, from one acquisition view (e.g., from data acquired during a single measurement interval), 4 or more views could be created depending, at least in part, upon the number of channels represented in the virtual channel(s). Respective views that are created may be offset by a specified amount in the x and/or z direction to mimic views acquired using a flying focal spot (e.g., without having to actually use a radiation source that comprises a flying focal spot). In another embodiment, one or more virtual channels may have a detector surface that is smaller than a detector surface of a conventional channel, allowing higher resolution images to be generated relative to the resolution of conventional images. Such higher resolution images (e.g., which are typically noisy images) may be used in combination or conjunction with lower resolution images (e.g., which are typically less noisy than the higher resolution images), indicative of larger virtual channels, for iterative reconstruction (e.g., where edge information may be acquired from the higher resolution images and contrast information may be acquired from the lower resolution images). Yet another benefit is that the virtual channels can be created in locations that are specified by a reconstruction algorithm (e.g., the effective location of (e.g., center of) the virtual channel can be located at a specified position) such that actions during reconstruction may be reduced (e.g., radial and/or z-interpolation acts may be eliminated). As another benefit, the detection area of respective virtual channels may be increased and/or decreased as a function of the measured dose (e.g., the number of photons detected by the detector array), for example, to reduce image artifacts caused by photon starvation, for example, during data acquisition. It will be appreciated that these and other benefits may be further realized from the following description.

FIG. 1 is an illustration of an example environment 100 of an example imaging modality that may be configured to generate data (e.g., images) representative of an object 102 or an aspect thereof under examination. It will be appreciated that the example configuration is merely intended to be representative of one type of image modality (e.g., a third-generation CT scanner) and is described herein merely to provide one example imaging modality. That is, the disclosure, including the scope of the claims, is not intended to be limited to a particular type(s) of imaging modality(ies) to the extent practical, but rather the systems and/or techniques described herein may be used in conjunction with a wide variety of imaging modalities, such as, but not limited to, SPECT, mammography, and/or digital radiography, etc., for example. Moreover, the placement of components is merely intended to be provided as an example and may not necessarily detail possible arrangements and/or configurations. For example, in one embodiment, the photon data processor 122 may be coupled to a rotating gantry 104 of the imaging modality.

In the example environment 100, an examination unit 108 of the imaging modality is configured to examine one or more objects 102. The examination unit 108 can comprise a rotating gantry 104 and a (stationary) support structure 110 (e.g., which may encase and/or surround as least a portion of the rotating gantry 104 (e.g., as illustrated with an outer, stationary ring, surrounding an outside edge of an inner, rotating ring)). During an examination of the object(s) 102, the object(s) 102 can be placed on a support article 112, such as a bed or conveyor belt, for example, that is selectively positioned in an examination region 114 (e.g., a hollow bore in the rotating gantry 104), and the rotating gantry 104 can be rotated and/or supported about the object(s) 102 by a rotator 116, such as a motor, drive shaft, chain, roller truck, etc.

The rotating gantry 104 may surround a portion of the examination region 114 and may comprise one or more radiation sources 118 (e.g., an ionizing x-ray source or other ionizing radiation source) and a photon counting detector array 106, comprised of a plurality of photon counting channels, that is mounted on a substantially diametrically opposite side of the rotating gantry 104 relative to the radiation source(s) 118.

During an examination of the object(s) 102, the radiation source(s) 118 emits fan, cone, wedge, and/or other shaped radiation 120 configurations from a focal spot(s) of the radiation source 118 (e.g., a point within the radiation source(s) 118 from which radiation 120 emanates) into the examination region 114. It will be appreciated that such radiation 120 may be emitted substantially continuously and/or may be emitted intermittently (e.g., a short pulse of radiation is emitted followed by a resting period during which the radiation source 118 is not activated).

The CT scanner or other imaging modality may be single energy or multi-energy (e.g., dual energy). Single energy imaging modalities generally comprise a single radiation source configured to emit radiation at a first energy spectrum. Multi-energy imaging modalities generally comprise one or more radiation sources and are configured to emit radiation at a plurality of different energy spectrums. Generally, multi-energy imaging modalities provide additional information (e.g., relative to the information provided by a single energy imaging modality) that may be used to segment and/or identify portions of the object 102 under examination. For example, dual-energy CT scanners provide for discriminating aspects of an object 102 based upon density and atomic number characteristics, whereas single energy CT scanners generally provide for discriminating aspects of the object 102 based merely upon density.

As the emitted radiation 120 traverses the object(s) 102, the radiation 120 may be attenuated differently by different aspects of the object(s) 102. Because different aspects attenuate different percentages of the radiation 120, an image(s) may be generated based upon the attenuation, or variations in the number of photons that are detected by the detector array 106. For example, more dense aspects of the object(s) 102, such as a bone or metal plate, may attenuate more of the radiation 120 (e.g., causing fewer photons to strike the detector array 106) than less dense aspects, such as skin or clothing.

The detector array 106 can comprise a linear or two-dimensional array of channels disposed as a single row or multiple rows in the shape of a circular, cylindrical, or spherical arc, for example, typically having a center of curvature at the focal spot of the radiation source(s) 118, for example. As the rotating gantry 104 rotates, the detector array 106 is configured to directly convert detected radiation into analog signals.

The detector array 106 is generally operated in a photon counting mode (e.g., as opposed to a charge integration mode). That is, the channels are of a photon counting type and are configured convert energy (e.g., in the case of CT scanners, x-ray energy) into signals that may be proportional to the energy of detected photons (e.g., where the detection of respective photons may be referred to as a detection event and/or the like). Thus, signals produced by respective channels generally comprise one or more current and/or voltage pulses, for example, respectively associated with a single detection event. Moreover, because the signals are generally proportional to the energy of detected photons, it will be appreciated that the components analyzing the signals may have the ability to determine respective energies of detected photons.

Signals that are produced by the detector array 106 or rather by photon counting channels comprised in the detector array 106 may be transmitted to a photon data processor 122 that is in operable communication with the detector array 106. The photon data processor 122 (e.g., which may be referred to as a controller) is configured to receive the signals and generate photon data indicative of, among other things, a location and detection time for respective photons detected by the detector array.

The detection times of respective photons may respectively correlate to a particular known position of the radiation source(s) 118 at those detection times. It will be appreciated that in some instances (e.g., because of practical limitations of the photon data processor 122), the photon data processor 122 may bin data related to the photons into temporal acquisition bins based upon their respective detection times. For example, the photon data processor 122 may be unable to correlate each detected photon with a position of the radiation source(s) 118 at the instance respective photons were emitted, so the photon data processor 122 may bin the photons that were detected in a particular time interval together and determine an approximate position of the radiation source 118 during that interval of time (e.g., which may be referred to as an acquisition view and/or the like). It will be understood that the number of temporal acquisition bins, which respectively correspond to an acquisition view, should be relatively large to reduce tangential blurring (e.g., caused when respective bins represent photons emitted during a larger span along the trajectory or movement of the radiation source(s) 118).

It will be appreciated that the photon data may be indicative of other characteristics of the detected photons besides detection time and location. For example, the photon data may include information related to an energy of detected photons and/or a trajectory/angle of respective photons from the radiation source(s) 118 to the detector array 106 (e.g., which may be derived by the photon data processor 122 based upon the location of a detected photon, the time it was detected, and a position of the radiation source(s) 118 when the photon was detected).

Moreover, as will be described in more detail below, in one embodiment, the photon data processor 122 may create virtual channels based upon the data yielded from respective channels of the detector array 106. For example, the data yielded from two or more channels of the detector array 106 may be combined to represent a single virtual channel that has a detection surface greater than the detection surface of any one of the two or more channels individually (e.g., the single virtual channel may have a detection surface substantially equivalent to the detection surface of the two or more channels that are combined to form the virtual channel). Additional features of the photon data processor 122 may be described below, but, in one embodiment, comprises weighting the contribution of respective channels to a virtual channel such that the number of photons associated with a virtual channel is substantially equivalent to an average number of photons detected by channels that are represented by the virtual channel.

The example environment 100 also illustrates as image reconstructor 124 that is operably coupled to the photon data processor 122 and is configured to generate one or more images representative of the object 102 under examination using suitable analytical, iterative, and/or other reconstruction technique (e.g., tomosynthesis reconstruction, back-projection, etc.). Generally, respective images focus on a plane (e.g., or slice) of the object under examination 102.

The example environment 100 also includes a terminal 126, or workstation (e.g., a computer), configured to receive image(s) from the image reconstructor 124, which can be displayed on a monitor 128 to a user 130 (e.g., security personnel, medical personnel, etc.). In this way, the user 130 can inspect the image(s) to identify areas of interest within the object(s) 102. The terminal 126 can also be configured to receive user input which can direct operations of the object examination apparatus 108 (e.g., a speed of gantry rotation, an energy level of the radiation, etc.).

In the example environment 100, a controller 132 is operably coupled to the terminal 126. In one example, the controller 132 is configured to receive user input from the terminal 126 and generate instructions for the examination unit 108 indicative of operations to be performed.

It will be appreciated that the example component diagram is merely intended to illustrate one embodiment of one type of imaging modality and is not intended to be interpreted in a limiting manner. For example, the functions of one or more components described herein may be separated into a plurality of components and/or the functions of two or more components described herein may be combined into merely a single component. Moreover, the imaging modality may comprise additional components to perform additional features, functions, etc.

FIG. 2 represents a portion of a conventional detector array 200 comprising indirect conversion, charge integrating channels 202, which have conventionally been used in CT applications and/or in other applications where photons are emitted at a high rate. Generally, respective channels comprise a detection surface (e.g., a surface facing the radiation source) of about 1 mm² or greater, with the x-dimension 204 and the z-dimension 206, respectively measuring about 1 mm or more. Conventionally, the indirect conversation type detector arrays 200 cannot comprise channels much smaller than this because of a loss in detection efficiency (e.g., where detection efficiency is the number of photons detected when no object is being examined relative to the number of photons emitted when no object is being examined) and/or an increase in optical cross-talk between channels (e.g., where light emitted from the indirect conversion material is transferred from one channel to another channel). Moreover, non-detecting regions 208 (e.g., comprised of septa that mitigate a transfer of light from one channel to another) generally separate respective charge integrating channels 202 causing some of the radiation that impinges the detector array 200 to be undetected.

FIG. 3 represents a portion of a photon counting detector array 300 (e.g., 106 in FIG. 1) comprising direct conversion, photon counting channels 302. Such channels 302 have typically not been used in imaging applications where photons are emitted at a relatively high emission rate, such as CT, because of saturation issues (e.g., pulse pileup) caused by the high emission rate (e.g., which may be greater than or equal to a rate of $10^8$ photons/second). However, as illustrated herein, the photon counting channels 302 respectively comprise a detection surface that is substantially smaller than the detection surface of an indirect conversion, charge integrating channel 202 (e.g., common in a conventional detector array 200 used in applications where photon saturation is a concern). In this way, photon counting channels 302 may be utilized in such applications while reducing (e.g., mitigating) saturation issues because fewer photons are detected per channel 302 (e.g., the same number of photons may be detected per unit area as detected by the detector array 200 in FIG. 2, but because there are more channels 302 per unit area relative to the channels 202 of the conventional detector array 200, respective channels may detect fewer photons).

Reference character 304 represents an enlarged view of a portion of the detection surface of the detector array 300. The enlarged portion comprises measurements (e.g., an x-dimension measurement 306 and a z-dimension measurement 308) similar to those of a charge integrating channel 202 illustrated in FIG. 2 (e.g., the enlarged view represents a 1 mm by 1 mm portion of the detection surface). As illustrated herein, for every charge integrating channel 202, the detector array 300 comprises 64 photon counting channels, although a different number of channels is possible and contemplated herein. For example, the number of photon counting channels comprised in the area occupied by a conventional charge integrating channel 202, may vary by about a factor of 2 to a factor of 10 or more in the x-dimension and/or in the z-dimension. Thus, the number of photon counting channels 302 occupying the area of a conventional charge integrating channel 202 (e.g., a 1 mm² area of the detection surface) may range from about 2 to about 100 or more.

The number of photon counting channels 302 of the detector array 300 occupying the space of a conventional charge integrating channel (e.g., a 1 mm² area) may depend upon, among other things, the desired rate(s) at which photons are emitted from a radiation source of the imaging modality comprising the photon counting detector array 300. That is, stated differently, the number of photon counting channels 302 per unit area may be predetermined to reduce (e.g., mitigate) saturation issues (e.g., pulse pile-up caused by too many photons being detected by a photon counting channel 302 in a short period of time). Imaging devices that emit photons at a higher rate may be prone to increased saturation issues, so the number of photon counting channels 302 per unit area (e.g., per mm$^2$) may be increased relative the number of photon counting channels 302 per unit area in a detector array of an imaging device that emits photons at a lower rate. The number of channels per unit area may also depend upon, among other things, a desired resolution, whether the data is going to be manipulated to mimic a flying focal spot, how the information from photon counting channels is going to be combined to form virtual channels, etc.

FIG. 4 illustrates an example photon data processor 400 (e.g., 122 in FIG. 2) that is configured to receive signals 450 from respective photon counting channels (e.g., 302 in FIG. 3) and generate photon data indicative of, among other things, a location and detection time for respective photons detected by a photon counting detector array (e.g., 106 in FIG. 1, 300 in FIG. 3). Moreover, as will be described in more detail below, the photon data processor 400 may be configured to generate virtual channels 452 and/or synthetic bins that may be transmitted to an image reconstructor (e.g., 124 in FIG. 1) for image reconstruction.

As illustrated, the example photon data processor 400 comprises a recording component 402, a binning component 404, and a channel combining component 406. The recording component 402 is configured to record, among other things, a location and detection time for respective photons detected by respective photon counting channels of the photon counting detector array (e.g., effectively causing each photon detected to be recorded). As one example, the recording component 402 may comprise one or more comparators configured to compare the voltage and/or current of the signals respectively output by the photon counting channels to a signal comprising a baseline voltage/current. If the voltage/current of the signal output by a photon counting channel exceeds a predetermined threshold (e.g., exceeds a voltage/current of the baseline signal), the comparator may trip and the recording component 402 may record when the comparator was tripped (e.g., a time) and/or may record which channel emitted the signal (e.g., a location). It will be appreciated that in another embodiment, the recording component 402 may also record other information about a detection event as represented in the signal, such as, for example, an energy level or energy spectrum of the photon that caused a pulse in the signal.

The binning component 404 is configured to, among other things, bin information about photons detected by photon counting channels during a given period of time into respective temporal acquisition bins representative of, among other things, a number of photons counted during a specified period of time and/or a location of a radiation source (e.g., location of radiation source at a time a photon was detected). For example, given the number of channels a detector array may comprise and given that computation resources are finite, it may be a burden to determine a precise location of the radiation source when each individually detected photons was emitted. The binning component 404 may thus bin information regarding a plurality of photons detected by a channel during a specified measurement interval (e.g., acquisition view) into a particular temporal acquisition bin. Respective temporal acquisition bins may therefore comprise information related to detected photons that were emitted from the radiation source when the radiation source was in a particular region (e.g., if the radiation source is rotating and/or otherwise moving relative to an object under examination). In this way, an approximate emission location for a group of photons, or rather an approximate location (e.g., range of locations) of a radiation source from which detected photons were emitted (e.g., photons binned into a corresponding bin), may be determined as opposed to the emission location for each individual photon, for example.

Moreover, in one embodiment (e.g., where an imaging modality is a multi-energy apparatus), the information may be further divided into temporal acquisition bins according to the energy level of respective detection events. For example, the binning component 404 may bin information indicative of higher energy photons strikes into a first set of temporal acquisition bins and may bin information indicative of lower energy photon strikes into a second set of temporal acquisition bins. Thus, the binning component 404 may divide acquired information from respective channels based upon, among other things, the time and energy level of respective detection events to which the information pertains.

The example photon data processor 400 further comprises a channel combining component 406 configured combine information derived from signals generated by two or more of the plurality of photon counting channels to create a virtual channel representing a spatial region occupied by the two or more channels on the detector array. In this way, the output 452 of the channel combining component 406 may be indicative of a virtual channel representing a larger area of the detection surface than the area occupied by any one of the channels whose information was combined to form the output. The output 452 of the channel combining component 406 (e.g., the virtual channels or synthetic bins representative of the virtual channels) may be output to an image reconstructor (e.g., 124 in FIG. 1), for example.

As an example, the channel combining component 406 may form a synthetic bin and create a virtual channel by combining a temporal acquisition bin indicative of information yielded from a first channel with a temporal acquisition bin indicative of information yielded from a second channel during a same or similar acquisition view. In this way, a virtual channel (e.g., representing an area of the detection surface that corresponds to an area occupied by the first and second channels) may be indicative of the number of photons counted by the region represented by the virtual channel during the acquisition view.

In one embodiment, the act of combined information yielded from two more photon counting channels also comprises weighting information from the channels that are combined to form a virtual channel(s). As will be described in more detail below, the number of photons that a virtual channel is treated as having detected may be substantially an average of the number of photons counted by the photon counting channels represented by the virtual channel (e.g., as opposed to a mere summation of the photons). For example, where a virtual channel comprises 100 channels that each detect 50 photons during an acquisition view, the virtual channel may merely be regarded as detecting 50 photons, as opposed to 50,000 photons. It may be appreciated that this can normalize virtual channels relative to other channels and/or relative to other virtual channels in applications where different virtual channels (e.g., representing a same acquisition view) comprise different numbers of channels and/or where virtual channels are used in conjunction with mere channels. That is, the contribution of the virtual channel to resultant imagery is the same or substantially the same as that of other channels and/or other virtual channels.

It may be appreciated that by weighting, the contribution of respective channels of a first virtual channel may be weighted differently than the contribution of respective channels of a second virtual channel. As an example, where the first virtual channel comprises 100 channels and the second virtual channel merely comprises 10 channels, respective channels of the first virtual channel may be weighted by a factor of 0.01 or $\frac{1}{100}$ (1/n, where "n" is the number of channels comprised in a virtual channel), whereas respective channels of the second virtual channel may be weighted by a factor of 0.1 or $\frac{1}{10}$.

It will also be appreciated that number of photon counting channels represented by or comprised within a virtual channel and/or the weights applied to respective channels may vary, for example, between applications, between acquisition views, and/or even within a same acquisition view. For example, the number of channels represented by a virtual channel may be a function of, among other things, at least one of a location of a virtual channel relative to a center of the detector array, an amount of radiation emitted by the radiation source, an acquisition view that is being represented by the virtual channel, and/or a number of photons detected by respective channels. By way of example, in one embodiment (e.g., where the number of channels represented in a virtual channel is a function of a location of a virtual channel relative to a center of the detector array) (e.g., as further described with respect to FIG. 8), a first virtual channel on an outside edge of the detector array may represent a larger portion of the detection surface than a second virtual channel approximate a center of the detector array (e.g., to provide increase image resolution near a center of the image). As such, the first virtual channel may be comprised of information yielded from 200 channels whereas the second virtual channel may be comprised of information yielded from 100 channels. Therefore, the information yielded from the 200 channels that are represented by the first virtual channel may be weighted by $\frac{1}{200}$th whereas the information yielded from the 100 channels that are represented by the second virtual channel may be weighted by $\frac{1}{100}^{th}$.

As another example, the size of the virtual channels (e.g., an amount of detection surface that the virtual channels respectively represent) may be (automatically/programmatically or manually) increased and/or decreased based upon a dose applied by the radiation source (e.g., the rate of photon emission and/or voltage applied to the radiation source) and/or based upon the number of photons detected by respective photon counting channels and/or by the detector array as a whole, for example. By way of example, when a radiation source is emitting photons at a higher rate, the size of respective virtual channels may be reduced (e.g., such that respective virtual channels represent fewer channels) relative to their size when photons are being emitted at a lower rate. Similarly, when a portion of the detector array is starved of photons (e.g., because a portion of an object being examined blocked a large percentage of the photons), the size of the virtual channel may be increased, relative to a default/specified size (e.g., to reduce the effect of photon starvation) Similarly, if an abundance of photons is being detected by a region of the detector array, virtual channels representing that particular region of the detector array may be reduced in size (e.g., such that respective virtual channels represent fewer channels than a default/specified number) such that the number of photons detected per virtual channel is reduced (e.g., although the total number of virtual channels in the region may be increased to accommodate the reduced size of respective virtual channels). In this way, the size of respective virtual channels may be dynamically modified (e.g., on the fly) as a function of the rate at which radiation is being emitted and/or as a function of the number of photons detected by respective channels, for example.

It will be appreciated that the instant disclosure, including the appended claims, contemplate any of a number of ways in which information from respective photon counting channels may be combined and/or weighted to create virtual channels, and information from respective photon counting channels may be combined/weighted in different ways depending upon the application. For example, in one embodiment, the information from channels may be combined/weighted in a way that causes the data to mimic data produced by a flying focal spot in the x- and/or z-dimensions (e.g., where a focal spot from which radiation is emitted is moved relative to the detector array). This and/or other examples may be described in more detail with respect to FIGS. 5-8.

FIG. 5 illustrates a portion of an example photon counting detector array 500 (e.g., 300 in FIG. 3) comprising a plurality of photon counting channels 502 (e.g., 302 in FIG. 3). It will be appreciated that in practice, the photon counting detector array 500 may comprise many more photon counting channels than illustrated and/or described herein. That is, merely a small portion of the detector array may be illustrated herein to aid in understanding, for example.

The boundaries of respective channels 502 are represented by dashed lines. Moreover, the number of photons counted by respective photon counting channels during a single acquisition view (and at a single energy spectrum) is imposed onto the photon counting channels 502. Further, virtual channels (e.g., as created by a channel combining component 406 in FIG. 4) are also imposed onto the photon counting channels (e.g., represented by solid black lines 504) to illustrate how a virtual channel represents a plurality of photon counting channels. For example, in the illustrated embodiment, respective virtual channels represent nine photon counting channels 502.

It will be appreciated that while FIG. 5 illustrates respective virtual channels as representing an equal number of photon counting channels in the x- and z-dimensions (e.g., left-to-right and top-to-bottom), in another embodiment, one or more virtual channels may have a different shape, such as rectangular, trapezoidal, or other shape, for example (e.g., where the virtual channel represents a different number of photon counting channels in the x-dimension than in the z-dimension). Moreover, it will be appreciated that, some of the virtual channels may represent a different number of photon counting channels 502 than other virtual channels (e.g., even when representing a same acquisition view). Further, some virtual channels may spatially overlap other virtual channels (even when representing a same acquisition view), which will also be described in more detail below.

FIG. 6 illustrates an example table 600 providing an example of how an channel combining component (e.g., 406 in FIG. 4) may combine information comprised in temporal acquisition bins for respective photon counting channels (e.g., as represented by the numbers in FIG. 5), and representing data acquired during a same acquisition view, to generate virtual channels representing a larger portion of the detection surface (e.g., relative to the detection surface of individual photon counting channels whose data is represented by the virtual channels). The first column 602 represents labels assigned to respective virtual channel. For example, a first virtual channel, labeled "1," may be comprised of the nine channels 502 in the top left corner of the example detector array 500, a second virtual channel, labeled "2," may be comprised of the nine channels 502 in the top middle of the example detector array 500, a third virtual channel, labeled "3," may be comprised of the nine channels 502 in the top right corner of the example detector array 500, a fourth virtual channel, labeled "4," may be comprised of the nine channels 502 in the bottom left corner of the example detector array 500, etc.

The total number of photons counted in an acquisition view by respective virtual channels is represented in a column 604 titled "total counted." Stated differently, the "total counted" value represents a sum of the number of photons counted by respective photon counting channels 502 that are represented in the virtual channel during the acquisition view. The column 606 labeled "average" represents an average number of photons counted by respective channels represented in the virtual channel. For example, with respect to channel 1, the total counted, 899 (100+99+98+100+112+90+101+99+100), is divided by the number of channels comprised in the virtual channel, 9, to derive the average. In one embodiment, it may be this column 606 of values (e.g., the average number of photons counted for the respective virtual channels) that is used by an image reconstructor, for example, to reconstruct an image representative of the virtual channels. In this way, as will be described in more detail below, some virtual channels may be larger than other virtual channels representative of a same/similar acquisition view, without having different gains (e.g., the sum totals may cause difference in gains because virtual channels representing more channels will typically indicate a larger sum of photons than virtual channels representing fewer channels), for example.

The column 608 labeled "weight" is indicative of the weight applied to respective channels that are represented in a virtual channel. The weight represents how much influence a particular channel had over the average number of photons detected by the virtual channel. In a simplified example where respective virtual channels represent a same number of channels and where respective channels within a virtual channel are assigned the same weight (e.g., as illustrated herein), the weight is the same for each photon counting channel that is represented by a virtual channel. However, in some embodiments, such as where some virtual channels represent more channels than other virtual channels, the weights may vary by virtual channel (e.g., thus channels represented by or comprised within a first virtual channel may have more impact on the photon count of the first virtual channel than channels represented by or comprised within a second virtual channel have on the second virtual channel where the first virtual channel comprises fewer channels than the second virtual channel). Further, in another embodiment, different weights may be applied to different channels represented by a same virtual channel. For example, during a calibration phase of the imaging modality, it may be determined that one channel is functioning improperly (e.g., due to a manufacturing error), and thus the one channel may be weighted differently than other channels represented by or comprised within the same virtual channel (e.g., to compensate for the manufacturing error).

As stated above, in some embodiments, in may be advantageous to create multiple, spatially overlapping virtual channels using the same and/or similar acquisition view data. For example, in one embodiment, it may be advantageous to mimic a focal spot shift in the data (e.g., without have to actually shift the focal spot in the x- and/or z-dimensions via a flying focal spot technique). Because the virtual channels respectively represent a plurality of photon counting channels, a channel combining component (e.g., 406 in FIG. 4), for example, may be configured to generate two or more sets of virtual channels using data representative of a same/similar acquisition view. In such an embodiment, a second set of virtual channels may be offset from the first set of channels by a specified number of photon counting channels. In such an example, two or more virtual channels, representing a same/similar acquisition view, may have one or more channels in common (e.g., where a channel is represented by or comprised within a first virtual channel in a first set of virtual channels and comprised within a second virtual channel in a second set of virtual channels, where the second set of virtual channels is offset from the first set of virtual channels by a specified number of photon counting channels).

FIG. 7 illustrates an example embodiment of the detector array 500 illustrating virtual channels that have been offset, in the x-direction (e.g., left-to-right), by a single row of photon counting channels 502 relative to the virtual channels illustrated in FIG. 5. It will be appreciated that the left-most column of photon counting channels may be incorporated into a virtual channel that comprises photon counting channels to the left of the left-most column (not shown) and/or may be disregarded (e.g., if there are not enough channels to the left to make up a virtual view), for example. Similarly, the two right-most columns of photon counting channels may be incorporated into a virtual channel that comprises photon counting channels to the right of the two right-most columns (not shown) and/or may be disregarded (e.g., if there are not enough channels to the right to make up a virtual view), for example.

It will be appreciated that the virtual channels illustrated in FIG. 7 and the virtual channels represented in FIG. 5 represent a same/similar acquisition view (e.g., as indicated by the fact that respective photon counting channels indicate a same number of photons counted in both FIGS. 5 and 7). Moreover, it will be appreciated that several of the channels are represented by or comprised within different virtual channels in FIG. 7 (e.g., where the virtual channels are offset by a column of photon counting channels) than in FIG. 5. For example, the channels comprised in the column labeled with character reference 702 are comprised in the left-most virtual channels in FIG. 7, whereas in FIG. 5, the same column 702 of channels was represented by virtual channels in the center of the illustrated detector array 500.

It will also be appreciated that manipulating the location of virtual channels, as described above, may be used for other purposes (e.g., and provide other benefits) besides mimicking a focal spot shift. For example, the channel combining component may manipulate the effective channel position of a virtual channel(s) to reduce computational cost during image reconstruction. By way of example, the effective position of a virtual channel, for purposes of image reconstruction, is generally defined as a center measurement of the channel. For example, with respect to FIG. 5, the effective position of the virtual channel in the upper left side of the example detector array 500, for purposes of image reconstruction, would be approximately in the center of the channel that counted 112 photons for. With respect to FIG. 7, the effective position of the virtual channel in the upper left side of the example detector array 500, for purposes of image reconstruction, would be approximately in the center of the channel that counted 90 photons. Thus, by shifting the virtual channels to the right by one column of photon counting channels, an effective position of the virtual channel is changed. It will be appreciated that the effective position of a virtual channel may also be changed by increasing or decreasing the number of channels that are represented by a virtual channel. For example, if a virtual channel represented four columns of channels, as opposed to the three columns, the effective position of the virtual channel may be situated between two columns of photon counting channels. Furthermore, by adjusting the weights used in combining the photon counting channels into virtual channels, one can achieve almost any desired center location for resulting virtual channels.

Further, as described above, the number of channels represented by respective virtual channels may differ between imaging modality applications, between acquisition views, and/or even within a same acquisition view, for example. In this way, in some embodiments, one or more virtual channels may represent a larger portion of the detection surface than other virtual channels.

Figure 8:
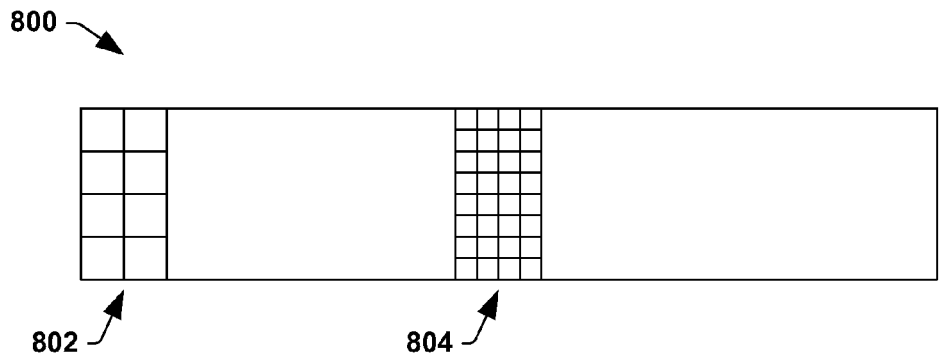
FIG. 8 illustrates a top-down view of an example photon counting detector array wherein virtual channels of varying sizes are imposed.

FIG. 8 illustrates a top-down view of an example detector array 800 (e.g. 106 in FIG. 1), where virtual channels 802, 804, representing photons counted during a single acquisition view, are imposed upon portions of the detector array 800. It will be appreciated that, although not illustrated, the example detector array 800 may comprise additional photon counting channels and/or additional virtual channels. FIG. 8 merely provides example sets of virtual channels 802, 804 to illustrate how some virtual channels may differ in size relative to other virtual channels, even within a same acquisition view. As illustrated, a first set of virtual channels 802 representing or comprising photon counting channels near an edge portion of the detector array 800 respectively represent a larger portion of the detection surface than a second set of virtual channels 804 representing or comprising photon counting channels closer to a center portion of the detector array.

In one embodiment, it is preferable that the detection surface of respective photon counting channels is substantially uniform (e.g., respective channels comprise an area of 0.25 $mm^2$). As a result, in such an embodiment, the number of channels represented by respective virtual channels may be varied (e.g., by a channel combining component (e.g., 406 in FIG. 4)) to vary the size of respective virtual channels. For example, respective virtual channels of the first set of virtual channels 802 may represent or comprise 200 photon counting channels, whereas merely 100 photon counting channels may be represented by or comprised within respective virtual channels of the second set of virtual channels 804. Thus, within a same acquisition view, a first virtual channel (e.g., comprised in the first set of virtual channels 802) may represent a different number of photon counting channels than a second virtual channel (e.g., comprised in the second set of virtual channels 804).

As described above with respect to FIG. 6, the weight applied to respective channels to derive a photon count for a virtual channel may depend upon, among other things, a number of photon counting channels represented by or comprised within the virtual channel. As a simplified example, where a first virtual channel represents 200 channels, the weight applied to respective photon counting channels may be 1/200 (e.g., the weight multiplied by the number of photons detected by a photon counting channel may equal the contribution made to the virtual channel by the photon counting channel), whereas the weight applied to respective photon counting channels represented by the virtual channel that merely represents 100 channels may be 1/100, for example. It will be appreciated that in another embodiment, where the weights of individual channels are varied to compensate for manufacturing errors, for example, some channels represented by the first virtual channel and/or some channels represented by the second virtual channel may be weighted more or less than the weights stated above. Thus, in one embodiment, even within a virtual channel, some photon counting channels may be weighted differently than other photon counting channels comprised by/within that virtual channel.

Figure 9:
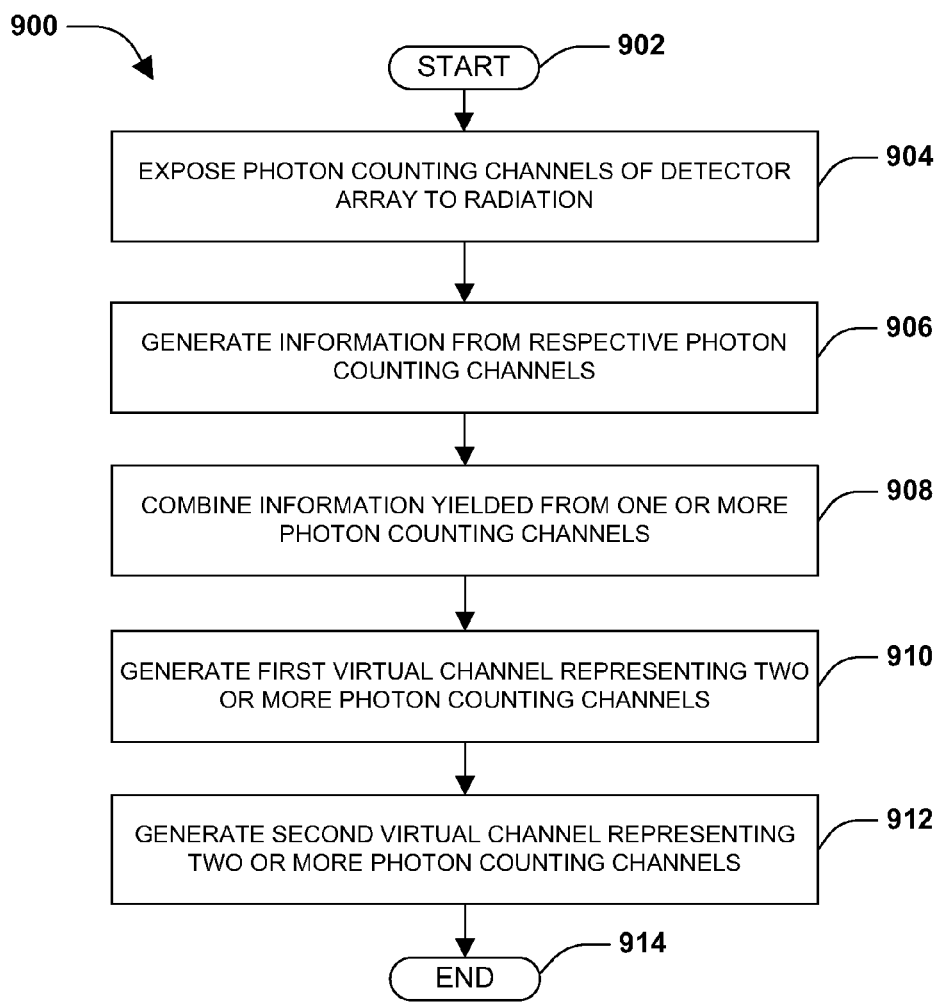
FIG. 9 is an example flow diagram illustrating an example method for generating virtual channels in an imaging modality.

FIG. 9 illustrates an example method 900 for generating virtual channels in an imaging modality. Such a method 900 may find applicability with respect to radiographic imaging modalities that generate images based upon detected photons. More particularly, the example method 900 finds applicability with respect to imaging modalities that comprise a photon counting detector array comprised of a plurality of photon counting channels. As an example, the method 900 may be used in CT applications where radiation photons are emitted at a relatively high emission rate and images are derived based upon detected radiation photons.

The example method 900 begins at 902 and photon counting channels of a detector array are exposed to radiation at 904. The radiation may be x-rays, gamma-rays, and/or other forms of radiation that comprise photons and that may be used for imaging an object under examination. Moreover, the channels may be exposed to radiation within a single energy spectrum and/or within two or more energy spectra.

At 906 in the example method 900, information is generated from respective photon counting channels when photons are detected. The information is generally indicative of a number of photons counted by respective channels during an acquisition view (e.g., measurement interval). However, the information may also be indicative of, among other things, an energy level/spectrum of detected photons, a location along a gantry from which the detected photons were respectively emitted, etc.

As an example, when a photon counting channel detects a photon (e.g., referred to as a detection event), the channel may emit an electric pulse indicative of the detection event. The mere fact that a pulse is generated may indicate that a detection event has occurred and may cause a photon data processor, for example, to count the detection event. The amplitude of the pulse, for example, may be indicative of an energy level of the pulse. Therefore, in applications where distinguishing between photons of two or more energy levels is desirable (e.g., such as in multi-energy imaging modalities), the amplitude of the pulse may be measured. Moreover, by determining which channel of the photon counting detector array generated the pulse, a location of the detection event and a location of the radiation source at the time the detected photon was emitted may be determined (e.g., where the rotational position of a rotating gantry to which the radiation source is attached is known at that time). It will be appreciated such information regarding a detection event may be saved and combined with information from other detection events (e.g., into temporal acquisition bins) as described with respect to FIG. 2. In this way, it may be determined how many photons (e.g., of respective energy spectra) were detected by respective photon counting channels during an acquisition view (e.g., measurement period).

While already described in detail with respect to FIG. 3, it will be appreciated that the photon counting channels are typically direct conversation channels respectively occupying a portion of the detection surface that is generally smaller than conventional charge integrating channels (e.g., less than 1 $mm^2$). For example, a 1 $mm^2$ portion of the detection surface may be occupied by between 2 and 100 photon counting channels, although it may be occupied by more than 100 photon counting channels (e.g., where merely a single conventional charge integrating channel is comprised in a 1 $mm^2$ area). The channels are also typically uniform across the detector, although in one embodiment, some of the channels may occupy a larger portion of the detector surface than other channels (e.g., and some channels may be larger than 1 $mm^2$).

At 908 in the example method 900, information yielded from one or more photon counting channels is combined, and virtual channels may be yielded therefrom. For example, at 910 in the example method 900, a first virtual channel representing two or more channels is generated and at 912 in the example method, a second virtual channel representing two or more channels is generated. Generally, the first virtual channel and the second virtual channel represent different photon counting channels, although there may be some overlap (e.g., causing the first virtual channel to spatially overlap the second virtual channel).

Generally, combining the information yielded from one or more photon counting channels causes a virtual channel to be created that is greater in area than that of a single photon counting channel. Stated differently, the output (e.g., the virtual channel) may represent a larger portion of the detection surface (e.g., 1 mm$^2$) than the individual photon counting channels whose information is combined for the virtual channel (e.g., which may each merely represent 0.25 mm$^2$ of the detection surface).

It will be appreciated that in one embodiment, combining the information yielded from two or more photon counting channels may involve more than a mere summation of the information. For example, as described with respect to FIG. 8, some virtual channels may be larger in size and/or represent a greater number of photon counting channels than other virtual channels (e.g., even representing a same acquisition view). For example, a first virtual channel may be formed by combining information from merely 2 photon counting channels while a second virtual channel may be formed by combining information from 10 or more photon counting channels. For example, the number of channels represented by a virtual channel may be a function of at least one of a location of a virtual channel relative to a center of the detector array, an amount of radiation emitted by the radiation source, an acquisition view that is being represented by the virtual channel, and/or a number of photons detected by respective channels, among other things (e.g., as described in more detail with respect to FIG. 4).

Because photon counting channels may be combined differently (e.g., virtual channels may represent a different number of photon counting channels), a mere summation of the information (e.g., photon counts) may result in a first virtual channel (e.g., representative of ten channels) having a different gain relative to a second virtual channel (e.g., representative of merely two channels). As mentioned above, weighting may be implemented whereby the sum total of respective channels of a particular virtual channel may be divided by the number of channels of the particular virtual channel and/or a weight (e.g., indicative of a contribution that a channel makes to the virtual channel) may be applied.

It will be appreciated that while reference is made herein to weighting respective photon counting channels, or information yielded from the respective channels, even when represented by a same virtual channel (e.g., such that each of 100 channels have a 1% contribution to the virtual channel), some channels that contribute to a same virtual channel may be weighted differently than other channels. By way of example, suppose a photon counting channel comprised a manufacturing defect that caused the photon counting channel to detect a lower than desired (e.g., lower than average) number of photons. A different weight may be applied to the defective photon counting channel, relative to the weight applied to other photon counting channels (e.g., or information yielded therefrom), to account for the manufacturing defect.

As described above, there are numerous factors that may play a role in determining how to combine information from one or more photon counting channels of the detector array to generate one or more virtual channels, and the factors that are taken into consideration may depend upon the application to which the example method 900 is applied. For example, in one embodiment, a plurality of different virtual channel sets are created from the same acquisition view, with virtual channels in a second set being offset by a predetermined number of channels relative to virtual channels in a first set (e.g., to mimic a flying focal spot). In this way, two or more virtual channels that at least partially overlap in the spatial domain (e.g., represent or comprise one or more of the same channels) may be generated. Moreover, in another embodiment, the effective position (e.g., location) of one or more virtual channels may be adjusted based upon image reconstruction considerations. The effective position of a virtual channel (e.g., or of any channel for that matter) is generally considered to be a center point of the virtual channel and calculations may be made with respect to the channel and/or virtual channel (e.g., by an image reconstructor) based upon the determined effective position of the virtual channel and/or channel. Therefore, by adjusting a number of photon counting channels that are combined to create a virtual channel and/or adjusting which photon counting channels are combined to create a virtual channel, and/or adjusting the weights applied to individual photon counting channels in the process of combining them, the effective position of the virtual channel can be adjusted in a manner that causes the virtual channel to be located in a desired position (e.g., that reduces and/or eliminates operations (e.g., interpolations) performed during image reconstruction). Such a scenario is further described with respect to FIG. 7.

Another factor that may be considered is image resolution, which may be altered by adjusting how photon counting channels (or information derived therefrom) is combined (e.g., to cause the virtual channels to increase or decrease in size). Generally speaking, the larger a virtual channel, the lower the resolution because a larger virtual channel represents or 'consumes' a larger surface area of the detector array than smaller virtual channels and/or photon counting channels. That is, a configuration where 100,000 photon counting channels of a detector array are arranged into 5000 virtual channels may yield a higher resolution image than a configuration where the 100,000 photon counting channels are arranged into 1000 virtual channels because the detector array effectively comprises five times as many channels in the 5000 virtual channel configuration than in the 1000 virtual channel configuration (e.g., each virtual channel of the 1000 virtual channel arrangement occupies or 'consumes' five times more photon counting channels than each virtual channel of the 5000 virtual channel arrangement. As a corollary, generally speaking, higher resolution images may also be more noisy than lower image resolutions because respective virtual channels represent fewer photon counting channels (e.g., the total number of photons represented by a virtual channel is less because fewer photon counting channels are represented by the virtual channel). Thus, the size of the virtual channels may be altered according to whether it is desirable to produce high resolution images or to produce less noisy images. For example, high resolution images may be desired for edge detection, whereas less noisy images may be desirable for contrast images. Therefore, in one embodiment, two sets of virtual channels may be created from an acquisition view. The first set may comprise (an increased number of) smaller virtual channels to produce high resolution images for edge detection and the second set may comprise (a lesser number of) larger virtual channels to produce lower resolution, less noisy images for contrast images, for example.

The example method 900 ends at 914.

Figure 10:
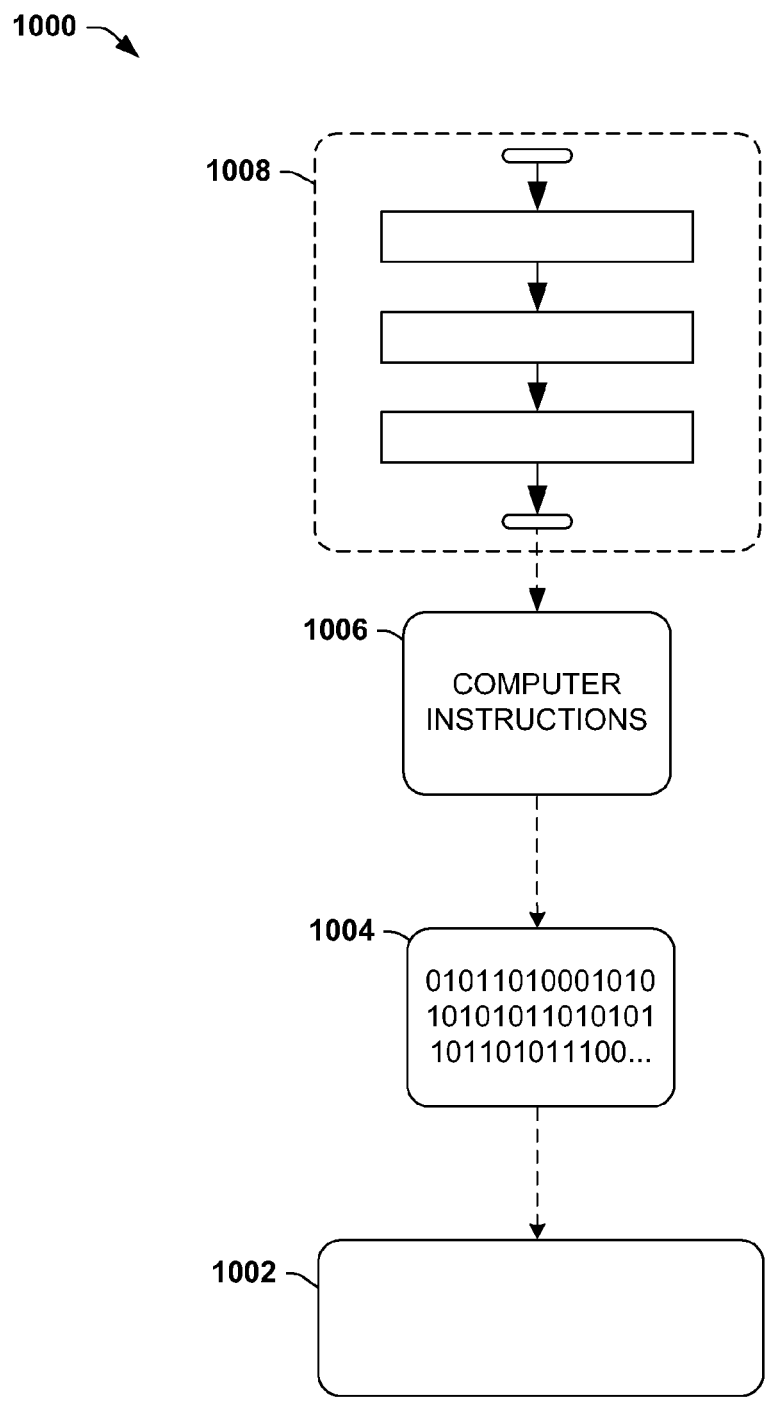
FIG. 10 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 10, wherein the implementation 1000 comprises a computer-readable medium 1002 (e.g., a flash drive, CD-R, DVD-R, application-specific integrated circuit (ASIC), field-programmable gate array (FPGA), a platter of a hard disk drive, etc.), on which is encoded computer-readable data 1004. This computer-readable data 1004 in turn comprises a set of computer instructions 1006 configured to operate according to one or more of the principles set forth herein. In one such embodiment 1000, the processor-executable instructions 1006 may be configured to perform a method 1008, such as at least some of the example method 800 of FIG. 8, for example. In another such embodiment, the processor-executable instructions 1006 may be configured to implement a system, such as at least some of the exemplary systems 100 and/or 400 of FIGS. 1 and 4, respectively, for example. Many such computer-readable media may be devised by those of ordinary skill in the art that are configured to operate in accordance with one or more of the techniques presented herein.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B" or two different (or identical) channels).

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for an imaging modality, comprising:
a radiation source configured to emit radiation photons;
a detector array configured to detect at least some of the radiation photons, the detector array comprising a plurality of photon counting channels; and
a channel combining component configured to generate a virtual channel representing at least a first photon counting channel of the plurality of photon counting channels and a second photon counting channel of the plurality of photon counting channels, wherein a number of photons counted by the virtual channel during a measurement interval corresponds to an average of a number of photons detected by the first photon counting channel during the measurement interval and a number of photons detected by the second photon counting channel during the measurement interval.

2. The system of claim 1, wherein the average corresponds to a weighted average based upon a first weight applied to the number of photons detected by the first photon counting channel and a second weight applied to the number of photons detected by the second photon counting channel.

3. The system of claim 2, the first weight different than the second weight.

4. The system of claim 1, the channel combining component configured to generate a second virtual channel representing at least the first photon counting channel and a third photon counting channel, wherein a number of photons counted by the second virtual channel during the measurement interval corresponds to an average of the number of photons detected by the first photon counting channel during the measurement interval and a number of photons detected by the third photon counting channel during the measurement interval.

5. The system of claim 1, the channel combining component configured to generate a second virtual channel, wherein the virtual channel represents a first number of the plurality of photon counting channels and the second virtual channel represents a second number of the plurality of photon counting channels, the first number different than the second number.

6. The system of claim 1, a number of photon counting channels represented by the virtual channel a function of at least one of:
- a location of the virtual channel relative to a center of the detector array;
- an amount of radiation emitted by the radiation source;
- an amount of radiation detected by the detector array; or
- an acquisition view to which the virtual channel is related.

7. The system of claim 1, the virtual channel representing a portion of the detector array occupied by the first photon counting channel and the second photon counting channel.

8. The system of claim 1, the virtual channel overlapping a second virtual channel generated by the channel combining component.

9. The system of claim 1, the radiation source comprising an ionizing radiation source.

10. The system of claim 1, the imaging modality comprising a CT imaging modality.

11. A method for generating virtual channels in an imaging modality, comprising:
- generating, by a first photon counting channel, information indicative of a number of photons detected by the first photon counting channel;
- generating, by a second photon counting channel, information indicative of a number of photons detected by the second photon counting channel; and
- generating a first virtual channel representing the first photon counting channel and the second photon counting channel, performing an averaging operation with regard to the information indicative of a number of photons detected by the first photon counting channel and the information indicative of a number of photons detected by the second photon counting channel to generate information corresponding to the first virtual channel.

12. The method of claim 11, comprising generating a second virtual channel that overlaps the first virtual channel.

13. The method of claim 11, comprising:
- generating a second virtual channel representing a third photon counting channel and a fourth photon counting channel, information indicative of a number of photons detected by the third photon counting channel and information indicative of a number of photons detected by the fourth photon counting channel combined to generate information corresponding to the second virtual channel; and
- reconstructing an image of an object based upon the information corresponding to the first virtual channel and the information corresponding to the second virtual channel.

14. The method of claim 11, comprising adjusting a size of the first virtual channel by altering a number of photon counting channels represented by the first virtual channel.

15. The method of claim 14, the altering comprising altering the number of photon counting channels represented by the first virtual channel based at least in part upon at least one of:
- a location on a detector array comprising the first photon counting channel and the second photon counting channel to which the first virtual channel corresponds;
- an amount of radiation detected by the detector array; or
- a dose applied by a radiation source.

16. The method of claim 11, the first virtual channel having an effective channel position, and the method comprising adjusting the effective channel position of the first virtual channel.

17. The method of claim 11, the generating a first virtual channel comprising:
- weighting the information indicative of a number of photons detected by the first photon counting channel to generate first weighted information; and
- weighting the information indicative of a number of photons detected by the second photon counting channel to generate second weighted information, wherein the performing an averaging operation comprises:
  - averaging the first weighted information with the second weighted information to generate the information corresponding to the first virtual channel.

18. The method of claim 11, the information indicative of a number of photons detected by the first photon counting channel weighted differently than the information indicative of a number of photons detected by the second photon counting channel.

19. A computer readable storage device comprising computer executable instructions that when executed perform a method, the method comprising:
- generating, by a first photon counting channel, information indicative of a number of photons detected by the first photon counting channel;
- generating, by a second photon counting channel, information indicative of a number of photons detected by the second photon counting channel; and
- generating a first virtual channel representing the first photon counting channel and the second photon counting channel, performing an averaging operation with regard to the information indicative of a number of photons detected by the first photon counting channel and the information indicative of a number of photons detected by the second photon counting channel to generate information corresponding to the first virtual channel.

20. The computer readable storage device of claim 19, the generating a first virtual channel comprising:
- weighting the information indicative of a number of photons detected by the first photon counting channel to generate first weighted information; and
- weighting the information indicative of a number of photons detected by the second photon counting channel to generate second weighted information, wherein the performing an averaging operation comprises:
  - averaging the first weighted information with the second weighted information to generate the information corresponding to the first virtual channel.

* * * * *